United States Patent
Gao et al.

(10) Patent No.: US 8,467,347 B2
(45) Date of Patent: Jun. 18, 2013

(54) METHOD AND APPARATUS FOR PROCESSING SIGNALS

(76) Inventors: Xingxin Gao, Stanford, CA (US); David P Varodayan, Stanford, CA (US)

( * ) Notice: Subject to any disclaimer, the term of this patent is extended or adjusted under 35 U.S.C. 154(b) by 344 days.

(21) Appl. No.: 12/912,878

(22) Filed: Oct. 27, 2010

(65) Prior Publication Data

US 2012/0026901 A1    Feb. 2, 2012

Related U.S. Application Data

(60) Provisional application No. 61/369,520, filed on Jul. 30, 2010.

(51) Int. Cl.
*H04W 4/00* (2009.01)
*H04J 1/00* (2006.01)
*H04J 3/00* (2006.01)
*H04B 1/709* (2011.01)

(52) U.S. Cl.
USPC ........... 370/330; 370/343; 370/345; 370/498; 375/142

(58) Field of Classification Search
USPC ............. 370/310–350, 441–442, 479–480, 370/498–499; 375/130–153
See application file for complete search history.

(56) References Cited

U.S. PATENT DOCUMENTS

| | | | | |
|---|---|---|---|---|
| 6,539,320 B1 * | 3/2003 | Szajnowski et al. | ............ | 702/79 |
| 8,055,087 B2 * | 11/2011 | Paniconi | ............ | 382/232 |
| 8,059,909 B2 * | 11/2011 | Paniconi | ............ | 382/261 |
| 8,314,736 B2 * | 11/2012 | Moshfeghi | ............ | 342/465 |
| 8,358,441 B2 * | 1/2013 | Chang et al. | ............ | 358/2.1 |
| 2005/0276361 A1 * | 12/2005 | Kim et al. | ............ | 375/347 |
| 2010/0104048 A1 * | 4/2010 | Chen | ............ | 375/340 |
| 2010/0216481 A1 * | 8/2010 | Gormley | ............ | 455/450 |

OTHER PUBLICATIONS

Candes et al, *People Hearing Without Listening, An Introduction to Compressive Sampling*, Applied and Computational Mathematics, CALTECH, Mar. 2008.
Borre et al, *A Software-Defined GPS and Galileo Receiver, Single Frequency Approach*, Birkhouser, Nov. 2006.

* cited by examiner

*Primary Examiner* — Tri H Phan

(57) ABSTRACT

Incoming signals that are sparse in the code-correlation domain, such as CDMA signal (GPS signals being a specific example of such signals) are processed by sampling the incoming signal at irregular time intervals at an average rate that is significantly lower than the Nyquist rate; which in the case of GPS signals is the chip rate of a pseudorandom code sequence that is embedded in the signal. The sampled signal is processed with locally generated signals that are also sampled the same irregular time intervals.

23 Claims, 2 Drawing Sheets

METHOD AND APPARATUS FOR PROCESSING SIGNALS

This application is related to a provisional application filed Jul. 30, 2010, which bears the Ser. No. 61/369,520.

BACKGROUND

This relates to processing of signals and, more particularly, processing of signals that are sparse in a code-correlation domain.

Code Division Multiple Access (CDMA) systems have been widely used in various applications, such as cellular communication and Global Positioning System (GPS). Typically, an information signal is modulated with a CDMA code, the resultant digital signal is modulated with an analog carrier signal, and the modulated signal is transmitted. Sometimes, such as in the GPS application, the information signal is itself digital.

At the receiver, the carrier-modulated analog signal is down-shifted, perhaps to baseband, sampled, quantized, and processed to recover the information signal. The modulation onto a carrier, transmission, and downshifting to remove the carrier can be viewed as mere perturbations that are imposed by the need to transmit the signal over a distance; and the sampling is simply a means for enabling the processing to be done digitally.

To illustrate, FIG. 1(a) presents an information signal 10 and FIG. 1(b) presents a CDMA pseudo-random (PRN) code sequence that, for convenience of the description herein, has values of +1 or −1. FIG. 1(c) shows the product of the information signal and the CDMA signal. Clearly, the original signal is completely recovered by multiplying modulated signal of FIG. 1(c) with a demodulating code that is identical to the code of FIG. 1(b); i.e. a demodulation signal that is (a) the same code as the modulating signal at the transmitter, and (b) is synchronized in time with the CDMA code that is embedded in the received signals. Thus, the processing at a receiver that is necessary to recover the information signal pretty much degenerates to the acquisition task of identifying the code that the receiver is to use, and identifying the time shift of that code. In many applications the code is known because the effort is actually focused on receiving the signal that was modulated by a particular code, so all that is left in such applications is to identify the proper time shift.

To perform this processing digitally on the sampled baseband received signal, the textbook teaching for the required sampling rate is that it must comport with the Nyquist-Shannon sampling theorem, which states that a function which contains no frequencies higher than B Hertz is completely determined by identifying the function's ordinates at a series of points spaced ½B seconds apart. In other words, to completely recover a signal that is band-limited to B Hertz, one has to sample the signal at a rate that is at least as great as 2B Hertz (Nyquist rate).

Based on this theorem, received CDMA signals are processed in receivers that process signals digitally by sampling the received baseband signals with a sampling clock that it at least twice the CDMA code's chip rate, which typically is significantly higher than the bandwidth of the information signal.

SUMMARY OF THE INVENTION

Significant advantage is achieved in the present invention with the realization that some signals, such as the CDMA signal (GPS signals being an illustrative example of CDMA signals), are sparse in the code-correlation domain, and measuring (i.e., processing) the signal in a manner where the measurements are incoherent with respect to the sparsity basis. Illustratively, the CDMA signal is transformed to another domain by sampling it in an essentially random manner, and processing the signal in that domain. The advantage that accrues in using this approach arises from the fact that the essentially random sampling is at a significantly lower rate than the Nyquist rate of the applied CDMA signal.

A number of embodiments are presented for processing GPS signals, including some that employ irregular sampled Digital Fourier Transform (ISDFT) process.

DETAILED DESCRIPTION

Figure 1:
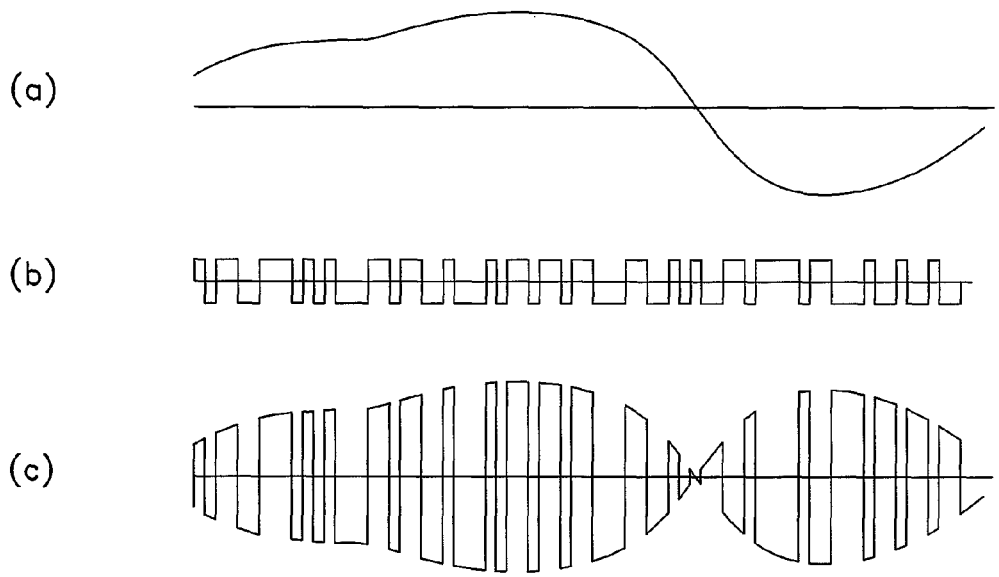
FIG. 1 illustrates CDMA modulation of an analog signal.

Transforming signals from one domain to another domain is fairly common in signal processing. Viewed expansively, transforming is an operation that is applied to an input set of coefficients to develop an output set of coefficients. A coefficient in the output set is created by applying a basis function to the input set from a specified basis function family. Common examples of transforming include Fast Fourier Transform (FFT), and Discrete Cosine Transform (DCT).

Signals are typically transformed in order to take advantage of characteristics of the signal in the domain to which it is transformed. For example, in the image processing field it is known that images (including pixelized images) contain a significant amount of redundancy, but in the pixels domain the redundancy is impossible to remove. One form of processing that is successful in removing at least some of the redundancy breaks the image into blocks, performs DCT transform on each block, and simply discards DCT coefficients that have a level lower than a preselected value. The result is a representation of the image that has much of the redundancy removed.

Generalizing on the above, one can say that if a signal, f, is transformable to n coefficients in a given domain, $\Psi$, and in that domain the transformed signal $Q=F_\psi(f)$ is sparse in the sense that many of the n coefficients have a value that is below a preselected threshold, then the processing burden can be reduced by discarding those low coefficients to form Q' before processing and executing the inverse transform $F^{-1}_\psi(P(Q'))$, where P(Q') is the processing performed on Q'.

An article titled "People Hearing Without Listening: An Introduction to Compressive Sampling," by Emmanuel J. Candés and Michael B. Wakin teaches that the steps of transforming and creating the reduced transform, Q', can be, effectively, done in one step by transforming f into m<<n coefficients in domain $\Phi$, if signal f is sparse in domain $\Psi$ (having only S significant elements). Subsequent processing with only the S significant elements can then proceed, and the probability is high that the processing will successfully approximate the true result if domain $\Phi$ is incoherent with domain $\Psi$, and if the number of coefficients m, though significantly smaller than n, is larger than C·S·log n, where C is some constant. In practice, the number of coefficients that one uses to insure a high probability of success is typically higher; such as m=C·S·(log n)$^4$.

One transformation to domain $\Phi$ that is incoherent with $\Psi$, almost regardless of the nature of domain $\Psi$ is sampling signal f at random or essentially random (e.g., pseudo-random) time instances.

We realized that the technique described above can be used in the acquisition of CDMA signals because the acquisition of CDMA signals involves transforming the signal to a code-correlation domain, which is incoherent with the random sampling domain $\Phi$; and in this code-correlation domain the signal is sparse. In particular, the signal exhibits a single peak in the code-correlation domain, at a time delay that corresponds to a synchronism with the CDMA code that is embedded in the CDMA signal, and if the code itself is not known, at a code value that corresponds to the code with which an information signal was modulated by a CDMA code.

The principle described above is also applicable to GPS signals where signal acquisition must account for signal's transit time, Doppler frequency shift that the signal experiences, the signal's CDMA code, and the code's phase relative to the phase of the code that is generated at the receiver. Even though the acquisition of GPS signals involves the additional factor of a Doppler frequency shift, the GPS signal is sparse in the correlation domain, with a peak occurring at the right code, time delay, and Doppler frequency shift.

The transmitted signal from satellite n can be expressed as $$S_{transmitted} = A^n D^n(t) x_{C/A}^n(t)\cos(2\pi(f_{L1})t+\phi_1) + B^n D^n(t) x_{P(Y)}^n(t)\sin(2\pi(f_{L1})t+\phi_1) \quad (1)$$

where $A^n$ and $B^n$ are magnitude constants, $D^n$ (t) is the data signal, $x_{C/A}^n(t)$ is the C/A code signal assigned to satellite n, $x_{P(Y)}^n$ is a secret code that is assigned to satellite n, $f_{L1}$ is the frequency of the carrier, and $\phi_1$ is the phase of the carrier relative to the beginning of the data and code signals.

A GPS receiver can engage in the processing of signals as if all of the possible satellites are present but, of course, some of the satellites are not within range of the GPS receiver's antenna so the processing results for those satellites are not viable. The following analysis follows the signal of only one satellite and, for sake of simplicity, superscript n is omitted from the equations, the C/A subscript is shortened to C, and the P(Y) subscript is shortened to P.

The transmitted signal is subjected to transit time delay to the receiver, $\tau$, and the signal that is received by a receiver's antenna experiences a Doppler frequency shift, $f_D$, due to the satellite's movement in its orbit and possible receiver motion. The received signal thus can be expressed as $$S_{received} = AD(t-\tau)x_C(t-\tau)\cos(2\pi(f_{L1}+f_D)(t-\tau)+\phi_1) + BD(t-\tau)x_P(t-\tau)\sin(2\pi(f_{L1}+f_D)(t-\tau)+\phi_1) \quad (2)$$

or simplified to $$S_{received} = AD(t-\tau)x_C(t-\tau)\cos(2\pi(f_{L1}+f_D)t+\phi_1-\phi_2) + BD(t-\tau)x_P(t-\tau)\sin(2\pi(f_{L1}+f_D)t+\phi_1-\phi_2). \quad (3)$$

When downshifted to baseband, the received signal is $$S_{downshifted} = AD(t-\tau)x_C(t-\tau)\cos(2\pi f_D t+\theta_1) + BD(t-\tau)x_P(t-\tau)\sin(2\pi f_D t+\theta_1). \quad (4)$$

Figure 2:
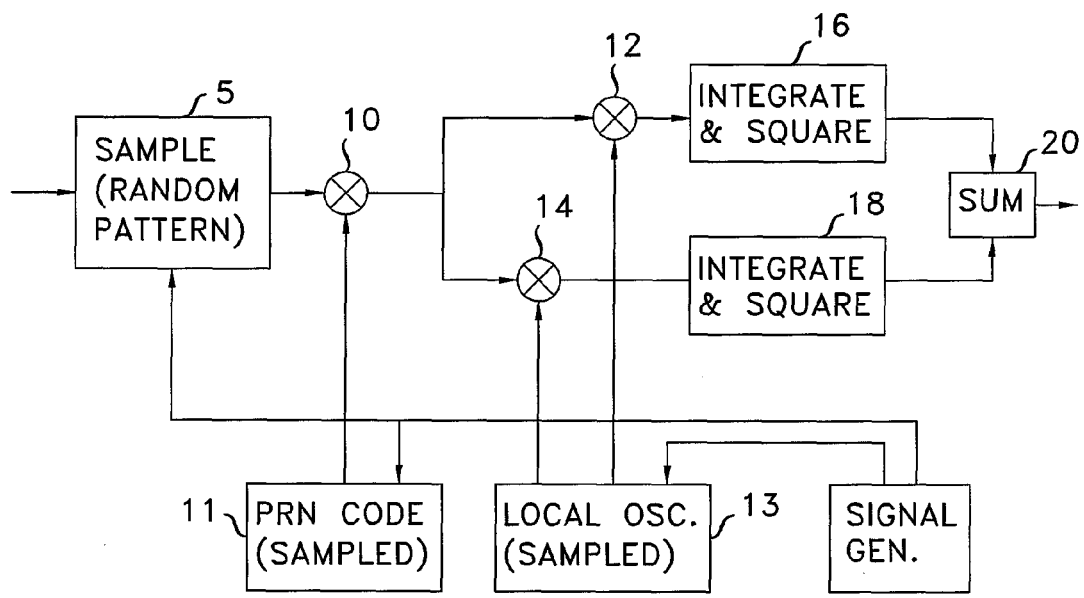
FIG. 2 depicts an embodiment where the input signal is sampled by a substantially random signal and correlated with a similarly sampled locally generated PRN code, followed by a Doppler frequency shift wipeoff.

FIG. 2 presents a block diagram of an arrangement in accord with the principles of this invention where a serial search is conducted over the code time shift space and the Doppler frequency shift space in an effort to acquire a GPS signal. The Eq. (4) GPS signal is applied to element 5 which, in accord with the above teachings, samples the incoming signal with a substantially random sampling (RS) signal; for example, a pseudo random sampling signal (i.e., a signal that samples at pseudorandom intervals of a given clock signal). Illustratively, the transforming performed in element 5 is sampling at random or pseudo-random instances, or clock signal intervals.

The sampled signal is applied to element 10 where it is multiplied by a chosen PRN code from the set of known codes; e.g., by code $x_C(t-\tau')$, where $\tau'$ is the unknown time shift of the code generated by element 11 (and sampled by the same random sampling sequence that is applied to the input signal by element 5) relative to the code used by the transmitter. The resulting product signal, which is applied to elements 12 and 14, is:

$$AD(t-\tau)x_C(t-\tau)x_C(t-\tau')\cos(2\pi f_D t+\theta_1) + BD(t-\tau)x_P(t-\tau) x_C(t-\tau')\sin(2\pi f_D t+\theta_1). \quad (5)$$

Code $x_C(t-\tau')$ is such that $\int x_P(t-\tau)x_C(t-\tau')$ is 0 in all circumstances and $\int x_C(t-\tau)x_C(t-\tau')$ is 0 except when $\tau=\tau'$. In other words, the product signal of element 10 is basically noise, except when the PRN code has the proper time delay. If, for sake of clarity, the signal components that are later removed by integration are ignored herein, then the output signal of element 10 is 0 except when the PRN code has the proper time delay, in which case the output signal is $$AD(t-\tau)\cos(2\pi f_D t+\theta_1). \quad (6)$$

In element 12 the product signal is multiplied by a cos $(2\pi f_i^d t+\phi_4)$ signal, which element 13 generates and samples by the RS sampling signal that is applied to the input signal in element 5, where $f_i^d$ is the $i^{th}$ Doppler frequency shift candidate. Concurrently, in element 14 the product signal is multiplied by the correspondingly sampled signal $\sin(2\pi f_i^d t+\phi_4)$ from element 13. The RS sampled sin signal and the cosine signals that element 13 generates can be viewed as a sampled phasor signal. In the situation where the output of element 12 is non-zero, that output is the sampled version of:

$$\frac{1}{2}AD(t-\tau)[\cos(2\pi(f_D+f_i^d)t+\theta_1+\varphi_4) + \cos(2\pi(f_D-f_i^d)t+\theta_1-\varphi_4)]. \quad (7)$$

and the output of element 14 is the sampled version of $$\frac{1}{2}AD(t-\tau)[\sin(2\pi(f_D+f_i^d)t+\theta_1+\varphi_4) + \sin(2\pi(-f_D+f_i^d)t-\theta_1+\varphi_4)]. \quad (8)$$

The important point to note in equations (7) and (8) is that all of the signal components are sinusoidal except when frequency $f_i^d=f_D$, in which case the outputs of elements 12 and 14 include a DC component as well.

The outputs of elements 12 and 14 are applied to elements 16 and 18, which integrate (and thus filter out all sinusoidal components and noise components) and square the applied signals. The outputs of elements 16 and 18 are $$\left(\frac{1}{2}AD(t-\tau)\cos(\theta_1-\varphi_4)\right)^2 \qquad (9)$$

$$\left(-\frac{1}{2}AD(t-\tau)\sin(\theta_1-\varphi_4)\right)^2 \qquad (10)$$

and those outputs are summed in element 20 to yield $$\frac{1}{4}A^2D^2(t-\tau).$$

The above is, of course, carried out when the PRN code developed by element 11 is time shifted appropriately and when the local oscillator outputs the proper Doppler shift frequency. Otherwise, the output of element 20 is noise-like and close to 0. Hence, in operation, the computations of the FIG. 2 circuit are repeated, under command of control circuit 8, for different time shifts imposed by element 11 on the PRN code, and for the different Doppler frequency shift candidates of element 13, to enable detecting a output.

When the PRN code that is used by the transmitter is known (such as when the process is focused on the signal that was modulated by a particular code), when this code has 1023 chips, and when the Doppler search is from −10 KHz to +10 KHz in 500 Hz increments, then the total number of required searches is 1023×41, or 41,943. From those 41,943 outputs controller 8 identifies the Doppler frequency shift and the code delay that produce a peak output, and this information is employed in further processing of the GPS signal.

Figure 3:
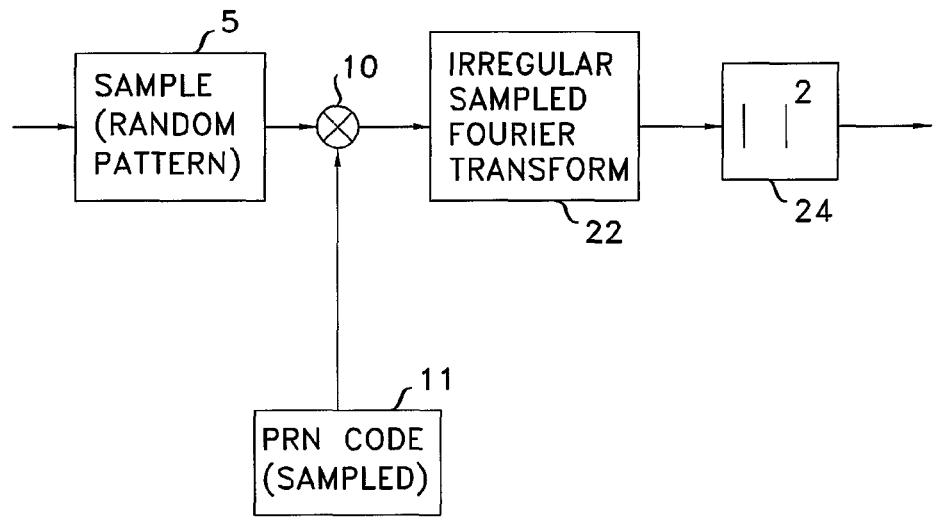
FIG. 3 depicts an embodiment where the input signal is sampled by a substantially random signal and correlated with a similarly sampled locally generated PRN code, followed by ISDFT process for carrying our the Doppler frequency shift wipeoff in parallel.

FIG. 3 presents a block diagram of an arrangement in accord with the principles of this invention where a serial search is conducted over the code time shift space, while Doppler frequency shift space is searched in parallel. In FIG. 3, a product signal is developed by element 10 as in FIG. 2 for a particular time shift of the PRN code generated by element 11 and applied to element 22 in blocks of N samples x(p) where p=0, 1, . . . , N−1. Element 22 executes an Irregular-Sampled Discrete Fourier Transform (ISDFT) to form N coefficients $X_k$ according to the formula $$X(k) = \frac{N}{\sum_{n=0}^{N-1} I_n} \sum_{n=0}^{N-1} x(n)I(n)e^{j\frac{2\pi k}{N}\sum_{m=0}^{n} I_m}. \qquad (11)$$

where $I_n$ is the time interval between the (n−1)$^{th}$ sample and the n$^{th}$ sample, normalized by the smallest inter-sample interval, and $I_0$=1. That is, the random sampling is simply random choosing of samples from a uniformly sampled set; for example, choosing the 1st sample from some arbitrary starting point of a uniformly sampled set, the 3$^{rd}$ sample (interval 2), the 5$^{th}$ sample (interval 2), the 9$^{th}$ sample (interval 4), etc. The value of N is a function of the desired granularity of the Doppler frequency shift.

Coefficients $X_k$ are complex numbers, each corresponding to the signal component at frequency k that is contained in the signal applied to element 10. Of course, the signal applied to element 10 has only one sinusoidal signal component, corresponding to the Doppler frequency shift, so the values of $X_k$ for all values of k other than that of the actual Doppler frequency shift are low (at noise level). The magnitudes of the coefficients are the correlation output candidates, so element 24 computes those magnitudes and identifies the coefficient with the largest magnitude.

Since all of the Doppler frequencies are considered simultaneously for each PRN code of a given time delay, the number of searches reduces to the 1023 time shifts of the locally generated PRN code.

The transform that is carried out in element 22 concurrently provides, as indicated above, correlation values for a given PRN code time shift, where each of the values developed by the transform represents a different Doppler frequency shift. A yet another embodiment is possible when a Fourier Transform type element is used to concurrently provide 1024 correlation values, where each of the values represents the correlation at a different time shift, though at a given Doppler frequency shift. This element is the Inverse ISDFT, which receives a 1024 set of frequency coefficients represented by the equation $$X_k = A^*_k B_k \qquad (12)$$

where $A^*_k$ is the complex conjugate of $A_k$, $A_k$ is a set of 1024 randomly sampled frequency coefficients of the PRN code a (n), and $B_k$ is a set of 1024 randomly sampled frequency coefficients of the applied GPS signal with an assumed Doppler frequency shift wiped-off, b(n). This works because, as pointed out by Bone et al in "*A Software-Defined GPS and Galileo Receiver Single-Frequency Approach*," ISBN 0-8176-4390-7, a set of N correlation values for signals a and b, where signal b is time shifted relative to signal a; i.e., $$x(n) = \sum_{m=1}^{N-1} b(m+n)a(m) \qquad (13)$$

for n=0, 1, . . . , N−1, has the Discrete Fourier Transform $$X(k) = \sum_{m=1}^{N-1}\sum_{n=1}^{N-1} b(m+n)a(m)e^{-j\frac{2\pi nk}{N}} \qquad (14)$$

$$\sum_{m=1}^{N-1}\sum_{n=1}^{N-1} b(m+n)a(m)e^{-j\frac{2\pi k((m+n)-m)}{N}}$$

$$\sum_{m=1}^{N-1}\sum_{n=1}^{N-1} b(m+n)a(m)e^{-j\frac{2\pi k(m+n)}{N}}e^{j\frac{2\pi km}{N}}$$

$$\sum_{m=1}^{N-1} a(m)e^{j\frac{\pi km}{N}}\sum_{n=1}^{N-1} b(m+n)e^{-j\frac{2\pi k(m+n)}{N}}$$

$$A^*(k)B(k).$$

What equation (14) states is that if signal a corresponds to the locally generated PRN code, and signal b is the input signal with a Doppler frequency shift wipe-off at a particular assumed frequency shift, then the frequency coefficients of the entire set of N correlation values for signals a and b are given by the set X(k), computed as specified in equation (14), and the set of correlation values themselves is given by the inverse DFT of X(k). It can be shown that the same holds true when using the ISDFT instead of the DFT and the inverse-ISDFT instead of the inverse-DFT. This structure is depicted in FIG. 4.

Figure 4:
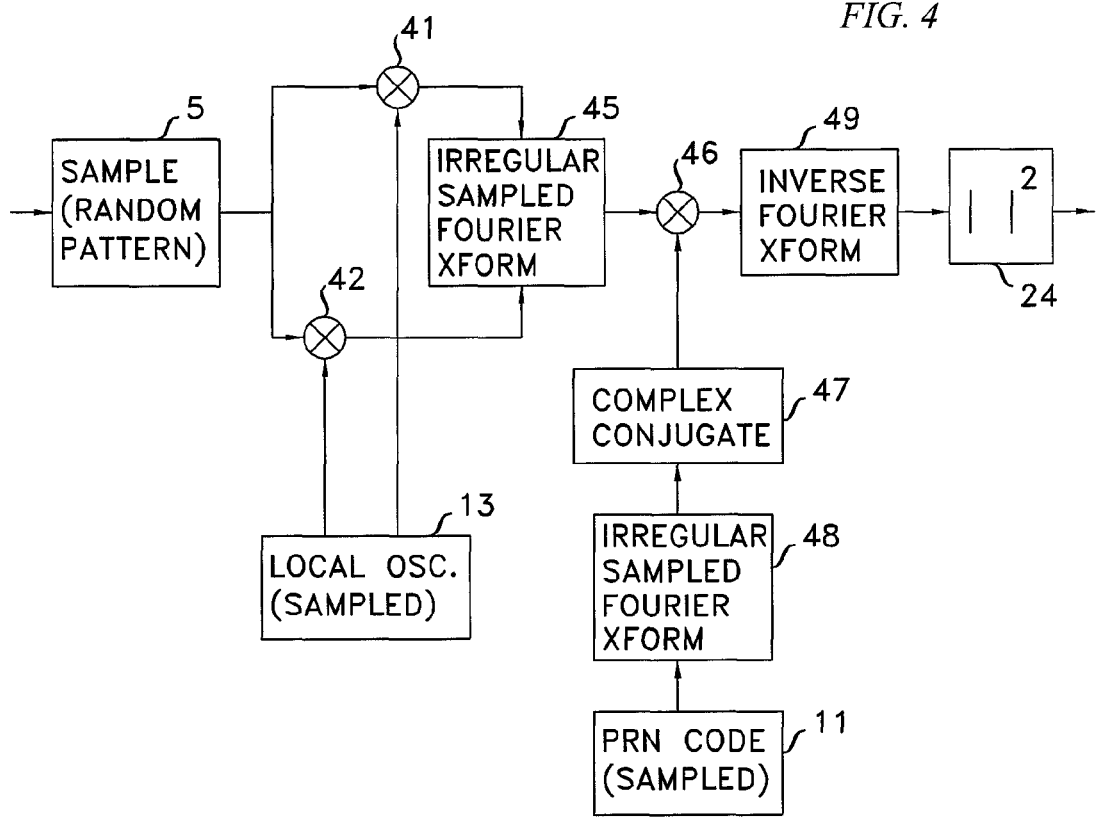
FIG. 4 depicts an embodiment where the input signal is sampled by a substantially random signal, followed by an ISDFT process for carrying our the Doppler frequency shift wipe-off in parallel, and the result is processed in the domain into which the ISDFT process transform applied signals.

Thus, FIG. 4 employs element 5 as in the FIG. 2 embodiment, and the output of element 5 is applied to multipliers 41 and 42. Local oscillator element 13 generates a cosine and sine sampled Doppler frequency shift signal (as described in connection with the FIG. 2 embodiment), and those signals are applied to multipliers 41 and 42, respectively. Sets of N output signals from multipliers 41 and 42 are concurrently applied to ISDFT element 45, and the sets of N outputs that element 45 produces are applied to multiplier 46.

As in the FIG. 2 embodiment, element 11 generates a local replica of the sampled PRN code that is known to be modulating the incoming PGS signal of interest and sets of N samples are applied to ISDFT element 48. The outputs of element 48 are signals that represent complex numbers, and those outputs are applied to element 47 the produces signals that represent the complex conjugate of each of the applied outputs. Sets of N outputs that element 47 produces are applied to multiplier 46, and sets of N outputs of multiplier 46 are applied to inverse-ISDFT element 49. The outputs of element 49 are applied to element 24 as in the FIG. 3 embodiment. When the code has 1023 chips, and when the Doppler search is from −10 KHz to +10 KHz in 500 Hz increments, then the total number of required searches for the FIG. 4 embodiment is 41.

The invention claimed is:

1. A method executed in a processing apparatus adapted to provide signals to a receiver module for transforming an applied signal to obtain a desired result, which method includes processing that comprises performing correlation, comprising the steps of:
   sampling said applied signal with an irregularly spaced sampling (ISS) signal to obtain a sampled input signal;
   performing said processing on said sampled input signal to obtain one or more results;
   identifying one of said results as said desired result; and
   outputting said result to be applied to said receiver module.

2. The method of claim 1 where said ISS signal is independent of a pseudo-random signal that is generated within said processing apparatus.

3. The method of claim 1 where said ISS signal samples a pseudo-random signal that is generated within said processing apparatus.

4. The method of claim 1 where said applied signal originates from one or more satellites.

5. The method of claim 1 where said applied signal is a CDMA signal or a Global Positioning System (GPS) signal.

6. The method of claim 5 where said desired result is information pertaining to global position or time of said processing unit.

7. The method of claim 1 where said step of processing performs calculations a number of times, which calculations involve multiplying said sampled input signal by differently shifted replica of a reference signal.

8. The method of claim 7 where said reference signal corresponds to a chosen pseudo-random (PRN) code sequence that was shifted by a preselected time delay and sampled by said ISS signal.

9. The method of claim 8 further comprising the steps of:
   generating said chosen PRN code sequence, and
   sampling said chosen PRN code sequence by said ISS signal.

10. The method of claim 8 where
    said applied signal is a Global Positioning System (GPS) signal that includes a Doppler frequency shift, and
    said processing further involves performing Doppler frequency shift wipe-off.

11. The method of claim 10 where said performing Doppler frequency shift wipe-off employs a generated phasor signal that is sampled by said ISS signal.

12. The method of claim 1 where said processing, at each of a predetermined number of times, comprises the steps of:
    multiplying said sampled input signal by a preselected PRN code that was sampled by said ISS signal, to obtain a first signal,
    multiplying said first signal by a sinusoidal signal that was sampled by said ISS signal to obtain a second signal, said sinusoidal signal having a preselected frequency;
    multiplying said first signal by a signal that is 90 degree shifted from said sinusoidal signal, also sampled by said ISS signal, to obtain a third signal; and
    low-pass filtering, squaring, and summing said second and third signals.

13. The method of claim 1 where said processing, at each of a predetermined number of times, comprises the steps of:
    multiplying said sampled input signal by a preselected PRN code that was shifted by a preselected time delay and sampled by said ISS signal to obtain a first signal,
    on each set of M samples of said first signal executing an Irregular Spaced Digital Fourier Transform (IDFT) to develop M complex outputs; and
    computing magnitudes of said M outputs.

14. The method of claim 1 where said processing, at each of a predetermined number of times, comprises the steps of:
    multiplying said sampled input signal by a phasor signal that was sampled by said ISS signal, to obtain a second signal comprising sample pairs, said phasor signal having a preselected frequency;
    for each set of N of said sample pairs performing an Irregular Sampled Digital Fourier Transform (ISDFT) to form a first set of N complex samples;
    multiplying said first set of N complex samples by a second set of N complex samples to form a third set of N complex samples;
    performing an inverse ISDFT on said third set of N complex numbers to obtain a fourth set of complex samples; and
    computing magnitudes of said N complex samples in said fourth set;
    where a chosen code sequence that is sampled by said ISS signal is applied to an ISDFT to obtain a fifth set of N complex samples, and said fifth set of N complex samples are subjected to a complex conjugation process to develop said third set of N complex samples.

15. Apparatus comprising:
    a first module responsive to an applied signal for sampling said applied signal with an irregularly spaced sampling (ISS) signal, which samples at irregularly spaced time intervals of a given clock signal, to obtain a sampled input signal;
    a code generation module that develops a chosen code sequence that is sampled by said ISS signal to form a sampled code sequence;
    a correlation module responsive to said sampled input signal and to said sampled code sequence for developing a product of said sampled input signal and said sampled code sequence; and
    a control module that directs said code generation module to create, at each of a number of iterations said product is created, said code sequence with a different delay relative to a preselected time, with the delayed code sequence sampled by said ISS signal.

16. The apparatus of claim 15 where said code sequence is a Code Division Multiple Access (CDMA) code sequence.

17. The apparatus of claim 15 where said applied signal is a satellite signal, further comprising:
    a module for generating a sinusoidal signal that is sampled by said ISS signal and a 90 degree-shifted replica of said sinusoidal signal that is sampled by said ISS signal;

a Doppler frequency shift wipe-off module that is responsive to said product of said sampled input signal and to said ISS-sampled sinusoidal signal and said ISS-sampled 90 degree-shifted replica of said sinusoidal signal.

18. The apparatus of claim 15 further comprising, when source of said applied signal is one or more satellites, a module interposed prior to or following said correlation module for performing Doppler frequency shift wipe-off.

19. Apparatus for processing an applied signal comprising:
a first module for sampling said applied signal at irregularly spaced time intervals to form a sampled signal; and
a second module for processing the sampled signal, which processing includes performing correlation with a provided reference signal, which reference signal is a signal sampled at said irregularly spaced time intervals.

20. The apparatus of claim 19 where said second module comprises:
a module that creates a predetermined pseudo-random code sequence that is sampled at said irregularly spaced time intervals to form a sampled pseudo-random code sequence;
a multiplier that multiplies the sampled signal of said first module by the sampled pseudo-random code sequence to develop a product signal;
an irregular sampled Fourier transform module responsive to said product signal that develops complex signals, and
a module that develops magnitudes of said complex signals.

21. The apparatus of claim 19 where said second module comprises:
a module that creates a predetermined pseudo-random code sequence that is sampled at said irregularly spaced time intervals, to form a sampled pseudo-random code sequence;
a first multiplier that multiplies the sampled signal of said first module by the sampled pseudo-random code sequence to develop a first product signal;
a module that creates a sinusoidal signal at a chosen frequency, which signal is sampled at said irregularly spaced time intervals, and a 90-degree shifted replica of said sinusoidal signal that is also sampled at said irregularly spaced time intervals;
a second multiplier responsive to said first product signal and to said sampled sinusoidal signal to develop a second product signal;
a third multiplier responsive to said first product signal and to said sampled shifted replica of said sinusoidal signal to develop a third product signal;
a module A that low-pass filters and squares said second product signal;
a modules B that low-pass filters and squares said third product signal; and
a summer responsive to said modules A and B.

22. The receiver of claim 21 where said low-pass filtering is effected through an integration process.

23. The apparatus of claim 19 where said second module comprises:
a module that creates a sinusoidal signal at a chosen frequency, which signal is sampled at said irregularly spaced time intervals, and a 90-degree shifted replica of said sinusoidal signal that is also sampled at said irregularly spaced time intervals;
a first multiplier responsive to said sampled signal of said first module 1 and to said sampled sinusoidal signal to develop a first product signal;
a second multiplier responsive to said sampled signal of said first module and to said sampled shifted replica of said sinusoidal signal to develop a second product signal;
a first irregularly sampled digital Fourier transform (IS-DFT) module responsive to said second product signal and to said first product signal and to said second product signal, forming complex signals;
a module that creates a predetermined pseudo-random code sequence that is sampled at said irregularly spaced time intervals to create a sampled pseudo-random code sequence;
a second ISDFT module responsive to said sampled pseudo-random code sequence, forming complex signals;
a conjugation module that complex conjugates the complex signals formed by said second ISDFT module;
a third multiplier that multiplies the formed signals of said first ISDFT module by the complex conjugated signals developed by said conjugation module;
an inverse ISDFT module responsive to said third multiplier, to develop complex signals; and
a module for developing magnitudes of the complex signals developed by said inverse ISDFT module.

* * * * *